(12) United States Patent
Takanashi (10) Patent No.: US 8,949,071 B2
(45) Date of Patent: Feb. 3, 2015

(54) CIRCULARITY MEASURING APPARATUS AND MEASUREMENT VALUE CORRECTING METHOD FOR CIRCULARITY MEASURING METHOD

(75) Inventor: Ryo Takanashi, Hachioji (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 483 days.

(21) Appl. No.: 13/349,016

(22) Filed: Jan. 12, 2012

(65) Prior Publication Data

US 2012/0185210 A1 Jul. 19, 2012

(30) Foreign Application Priority Data

Jan. 13, 2011 (JP) .................................. 2011-005009

(51) Int. Cl.
| | | |
|---|---|---|
| G06F 15/00 | (2006.01) | |
| G01B 5/20 | (2006.01) | |
| G01B 7/28 | (2006.01) | |
| G01B 7/12 | (2006.01) | |
| G01B 21/20 | (2006.01) | |
| G01B 5/008 | (2006.01) | |
| G01B 21/04 | (2006.01) | |

(52) U.S. Cl.
CPC ............... *G01B 5/201* (2013.01); *G01B 7/282* (2013.01); *G01B 7/12* (2013.01); *G01B 21/20* (2013.01); *G01B 5/008* (2013.01); *G01B 21/045* (2013.01)
USPC ............. 702/168; 702/95; 702/151; 702/167; 33/502; 33/503; 33/550; 33/553

(58) Field of Classification Search
CPC ...... G01B 21/045; G01B 5/201; G01B 5/008; G01B 21/20; G01B 7/282; G01B 7/12
USPC ............. 702/168, 95, 152, 167; 33/502, 503, 33/550, 553
See application file for complete search history.

(56) References Cited

U.S. PATENT DOCUMENTS

| | | | | |
|---|---|---|---|---|
| 6,526,364 | B2* | 2/2003 | Omori et al. ..................... | 702/95 |
| 6,546,640 | B2* | 4/2003 | Okada et al. ..................... | 33/503 |
| 6,850,806 | B2* | 2/2005 | Yutkowitz ....................... | 700/54 |
| 6,859,747 | B2* | 2/2005 | Yutkowitz ...................... | 702/105 |
| 6,865,499 | B2* | 3/2005 | Yutkowitz ...................... | 702/105 |
| 6,886,264 | B2* | 5/2005 | Sakata et al. ................... | 33/502 |
| 6,920,408 | B2* | 7/2005 | Yutkowitz ...................... | 702/105 |
| 7,290,348 | B2* | 11/2007 | Katamachi ....................... | 33/550 |
| 8,356,417 | B2* | 1/2013 | Hagino et al. ................... | 33/553 |
| 2003/0033105 | A1* | 2/2003 | Yutkowitz ...................... | 702/105 |
| 2003/0036868 | A1* | 2/2003 | Yutkowitz ...................... | 702/105 |

(Continued)

FOREIGN PATENT DOCUMENTS

| | | |
|---|---|---|
| EP | 1 467 175 A2 | 10/2004 |
| JP | 55-9132 A | 1/1980 |

(Continued)

*Primary Examiner* — Carol S Tsai
(74) *Attorney, Agent, or Firm* — Sughrue Mion, PLLC (57) ABSTRACT

According to the present invention, a center deviation amount, which is an amount of deviation (distance) between the center line of a reference measurement target and the detection point is calculated using the reference measurement target having a known diameter, and a measurement value of a diameter of an arbitrary measurement target is corrected using the center deviation amount. Therefore, an accurate diameter value can be calculated even in the case of a measurement target having a diameter value different from the diameter value of the reference measurement target.

9 Claims, 6 Drawing Sheets

(56) References Cited

U.S. PATENT DOCUMENTS

2003/0056147 A1* 3/2003 Yutkowitz ..................... 714/25
2004/0193385 A1* 9/2004 Yutkowitz ..................... 702/151
2004/0200085 A1* 10/2004 Sakata et al. .................. 33/550

FOREIGN PATENT DOCUMENTS

JP     1-259211 A     10/1989
JP     4163545 B2     10/2008

* cited by examiner

$D3 = R5 (=D4) + 2\varDelta R$
$D3 \neq R'5 (=D4) + 2\varDelta R'$

CIRCULARITY MEASURING APPARATUS AND MEASUREMENT VALUE CORRECTING METHOD FOR CIRCULARITY MEASURING METHOD

BACKGROUND OF THE INVENTION

1. Field of the Invention

The present invention relates to a circularity measuring apparatus and a measurement value correcting method for circularity measuring method.

2. Description of the Related Art

Conventionally, a circularity measuring apparatus (a circularity measuring machine) that measures a circularity of a circular object such as a cylindrical object has been known. For example, in this circularity measuring apparatus, an object to be measured (a work) having a circular section such as a cylindrical object is placed on a rotatable mounting base, a tip terminal (a probe) is brought into contact with the surface of the work, and a displacement of the tip terminal associated with the rotation of the work is measured, thereby measuring an outer shape of the circular section.

For example, Japanese Unexamined Patent Application Publication No. 1-259211 describes a diameter measuring apparatus of a circularity measuring machine. The circularity measuring machine includes a horizontal arm guiding a contact of a first detector horizontally and in a diameter direction with respect to a cylindrical work, a support frame for the first detector provided at a tip of this arm and allowing the contact of the first detector to make contact with two points at diameter positions, and a second detector for diameter measurement to detect a horizontal movement amount of the horizontal arm. In this apparatus, in advance, a master piece is first set on a rotary base, and the contact of the first detector is brought into contact with a right side surface of the master piece and a measurement value is obtained from the second detector. Next, the contact is brought into contact with a left side surface of the master piece and another measurement value is obtained from the second detector. Then, using these two measurement values from the second detector, an error value of this apparatus is calculated based on known dimensions of the master piece. Then, a work is set in place of the master piece, and a diameter dimension is similarly measured for error correction.

Also, Japanese Patent No. 4163545 describes a reference jig for a circularity measuring machine, the reference jig obtaining information about an origin of the circularity measuring machine and performing calibration of a detector for measuring a surface shape of a measurement target. This reference jig is removably placed on an upper surface of an XY table on a rotary table. The reference jig is provided with a mounting base formed in a stepped disk shape and a calibration master that is provided an upper step part of the mounting base to allow sensitivity calibration of a probe (a detector). Above the calibration master, the reference jig includes an origin ball (a reference ball) which is arranged so as to enable to measure an X-axis direction of a lowermost surface and an uppermost surface and a Z-axis direction of a right side surface and a left side surface of the calibration master. Positional deviations of a stylus (a sensor) provided to the probe are obtained for respective postures of the probe and as correction values. In this art, the reference jig for a circularity measuring machine is placed on a measurement-target rotary mechanism, and the sensor of the detector of the circularity measuring machine is brought into contact with the reference ball, thereby obtaining origin information of the circularity measuring machine. Also, the sensor of the detector is related to a calibration master, thereby performing sensitivity calibration of the detector.

SUMMARY OF THE INVENTION

However, when a measurement target is placed on the table of the circularity measuring apparatus and the probe of the detector is caused to abut on the measurement target, it is extremely difficult to match a center line of the measurement target and a detection point where the probe is caused to abut on the measurement target. In other words, although it is preferable that the probe of the detector is caused to abut on an extended straight line of the center line of the measurement target in order to accurately measure a diameter of the measurement is performed, actually, the probe tends to be displaced from the extended line of the center line of the measurement target in many cases (center deviation between the center line of the measurement target and the detection point).

Figure 8:
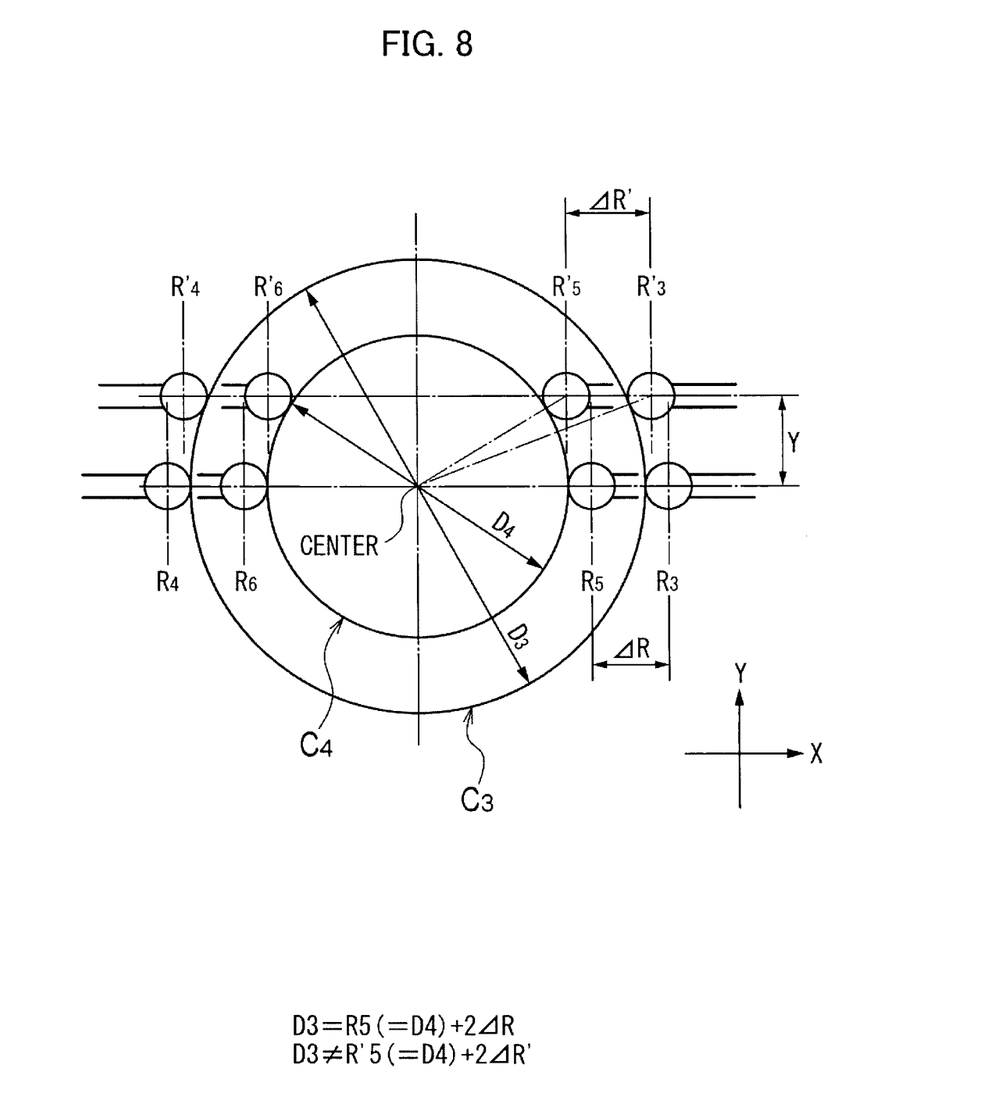
FIG. 8 is a plan view depicting a method of calculating a center deviation amount and a diameter value of a tip ball by measuring two reference measurement targets having known different diameter values at two, left and right, points facing each other that are positioned shifted from the center line.

Nevertheless, in conventional art, a measurement value is corrected without regard to the center deviation (Y in FIG. 8) between the center line of the measurement target and the detection point. This problem is explained below with reference to FIG. 8. In the conventional correction method, a radius of a reference measurement target with a known diameter $D_4$ is measured as a distance between the detection point and a line which passes through the center and is perpendicular to the center line to obtain a measurement value $R_5$. Because it is assumed that there is no center deviation in the conventional art, a difference between the measurement value $R_5$ and $D_4/2$ is obtained as a correction value. When there is actually no center deviation, the correction value can be used to correct a measurement value $R_3$ of a measurement target having a diameter $D_3$ different from the diameter $D_4$ of the reference measurement target. On the other hand, when there is the center deviation, as illustrated in FIG. 8, the measurement value $R'_5$ of the reference measurement target having the diameter $D_4$ does not correctly represent its diameter $D_4/2$. Similarly, the measurement value $R'_3$ of the measurement target having the diameter $D_3$ does not correctly represent its diameter $D_3/2$. When there is the center deviation, the measurement value $R'_3$ of the measurement target having the diameter $D_3$ cannot be accurately corrected using a difference between the measurement value $R'_5$ and the $D_4/2$. Therefore, conventionally, when there is the center deviation, for a measurement target having a diameter value different from a diameter value of a reference measurement target, there is a problem that an accurate diameter value cannot be measured.

The present invention was made in view of this problem described above, and has an object of providing a circularity measuring apparatus and a measurement value correcting method for circularity measuring method capable of, even in the case of a measurement target having a diameter value different from a diameter value of a reference measurement target, calculating an accurate diameter value by calculating a center deviation amount, which is an amount of deviation between a center line of the measurement target and a detection point, for correction.

To achieve the object described above, a first aspect of the present invention provides a circularity measuring apparatus for measuring a circularity of a substantially circular measurement target by mounting the measurement target on a mount base in a manner that a center of the measurement target matches with a center of rotation, rotating the measurement target relative to a detector, the apparatus comprising: a driving device which linearly moves the detector relative to a measurement target mounted on the mounting base; a center deviation amount calculating device which, when the driving device linearly moves the detector relative to a substantially circular reference measurement target with a known diameter mounted on the mounting base and the detector measures a distance between two detection points which are two points on a path along which the detector moves and on a perimeter of the reference measurement target, calculates a center deviation amount representing a distance between the center of the reference measurement target and a straight line representing the path along which the detector moves based on the diameter of the reference measurement target and the distance between the two detection points; and a measurement value correcting device which, when driving device linearly moves the detector relative to an arbitrary measurement target mounted on the mounting base instead of the reference measurement target and the detector measures as a diameter of the arbitrary measurement target, a distance between two detection points which are two points on a path along which the detector moves and on a perimeter of the arbitrary measurement target, corrects the diameter of the arbitrary measurement target using the center deviation amount.

Here, the center deviation amount representing a distance between the center of the measurement target and a straight line representing the path along which the detector moves. When a diameter of the measurement target is measured, it is preferable that the detection points and a center of the measurement target are located on one straight line (there is no center deviation in this case). However, it is actually difficult to achieve, and the center deviation causes measurement error. In the first aspect of the present invention, a center deviation amount is calculated using a reference measurement target having a known diameter, and a measurement value of a diameter of an arbitrary measurement target can be corrected using the center deviation amount. Thus, an accurate diameter value can be calculated even in the case of a measurement target having a diameter value different from a diameter value of a reference measurement target.

Also, according to a second aspect of the present invention, the center of the arbitrary measurement target is a center of a least square circle of a shape formed by points on an outer perimeter of the arbitrary measurement target with which the detector is in contact at the time of measurement.

With this, even when the measurement target does not have a perfect circular shape, an accurate measurement can be performed with the shape being taken as a perfect circle as nearly as possible.

Furthermore, to also achieve the object described above, a third aspect of the present invention provides, a measurement value correcting method for a circularity measuring method for measuring a circularity of a substantially circular measurement target by mounting the measurement target on a mount base in a manner that a center of the measurement target matches with a center of rotation, rotating the measurement target relative to a detector, the measurement value correcting method comprising: linearly moving the detector relative to a substantially circular reference measurement target with a known diameter mounted on the mounting base; measuring a distance between two detection points which are two points on a path along which the detector moves and on a perimeter of the reference measurement target; calculating a center deviation amount representing a distance between the center of the reference measurement target and a straight line representing the path along which the detector moves based on the diameter of the reference measurement target and the distance between the two detection points; linearly moving the detector relative to an arbitrary measurement target mounted on the mounting base instead of the reference measurement target; measuring as a diameter of the arbitrary measurement target, a distance between two detection points which are two points on a path along which the detector moves and on a perimeter of the arbitrary measurement target; and correcting the diameter of the arbitrary measurement target using the center deviation amount.

Similar to the first aspect, also in the third aspect of the present invention, a center deviation amount is calculated using a reference measurement target having a known diameter, and a measurement value of a diameter of an arbitrary measurement target can be corrected using the center deviation amount. Thus, an accurate diameter value can be calculated even in the case of a measurement target having a diameter value different from the diameter value of the reference measurement target.

Still further, according to a fourth aspect of the present invention, the center of the arbitrary measurement target is a center of a least square circle of a shape formed by points on an outer perimeter of the arbitrary measurement target with which the detector is in contact at the time of measurement.

With this, even when the measurement target does not have a perfect circular shape, an accurate measurement can be performed with the shape being taken as a perfect circle as nearly as possible.

As has been described above, according to the present invention, a center deviation amount, which is an amount of deviation (distance) between the center line of a reference measurement target and the detection point is calculated using the reference measurement target having a known diameter, and a measurement value of a diameter of an arbitrary measurement target is corrected using the center deviation amount. Therefore, an accurate diameter value can be calculated even in the case of a measurement target having a diameter value different from the diameter value of the reference measurement target.

DETAILED DESCRIPTION OF THE PREFERRED EMBODIMENTS

With reference to the attached drawings, the circularity measuring apparatus and the center-deviation-amount correcting method therefor according to the present invention are described in detail below.

Figure 1:
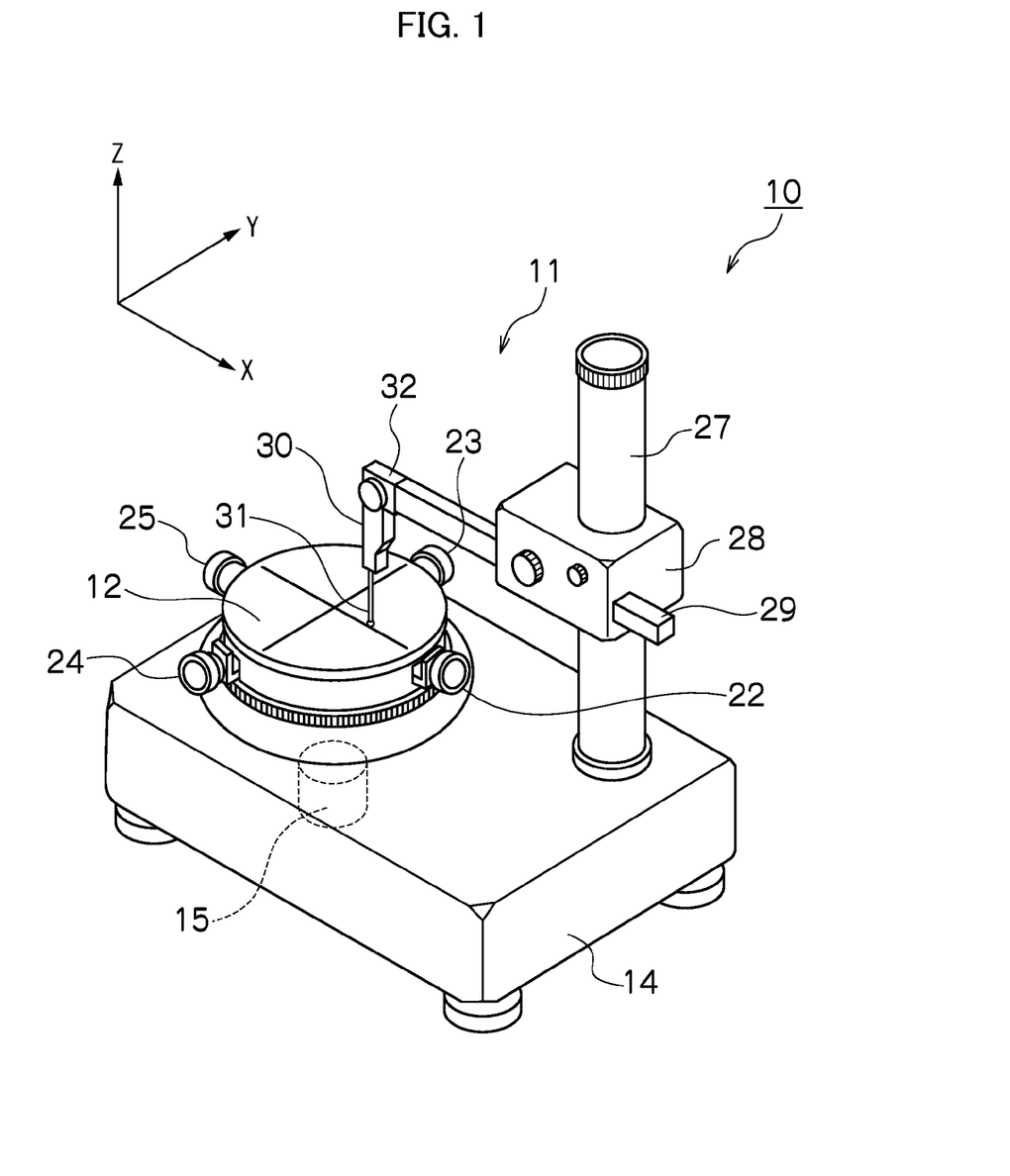
FIG. 1 is an external perspective view of a circularity measuring apparatus according to an embodiment of the present invention.

FIG. 1 is an external perspective view of a circularity measuring apparatus according to an embodiment of the present invention.

The circularity measuring apparatus includes a measuring machine body and a computing apparatus. In FIG. 1, a measuring machine body 11 of a circularity measuring apparatus 10 is depicted.

The measuring machine body 11 is provided with a mounting base (XY/tilting table) 12 where a measurement target (not shown) is to be placed on a base 14. The mounting base (XY/tilting table) 12 includes an X-direction fine-adjustment knob 22 and a Y-direction fine-adjustment knob 24. The X-direction fine-adjustment knob 22 and the Y-direction fine-adjustment knob 24 are each coupled to a mounting-base moving shaft. With these fine-adjustment knobs 22 and 24, the mounting base 12 can be finely moved for adjustment in an X direction and a Y direction, thereby finely adjusting a horizontal position of the mounting base 12.

Also, the mounting base 12 is provided with an X-direction tilt knob 25 and a Y-direction tilt knob 23, thereby adjusting the tilt in an X direction and a Y direction.

Furthermore, a rotary mechanism 15 is provided in a lower portion of the mounting base 12. The rotary mechanism 15 is to rotate the measurement target placed on the mounting base 12 by driving the mounting base 12 to rotation.

Still further, a column (columnar support) 27 extending approximately vertically upward stands on the base 14. A slider 28 is attached to the column 27 so as to be movable upward and downward. A horizontal arm (a diameter-direction moving shaft) 29 is attached to the slider 28 so as to be allowed to be driven in a horizontal direction.

A detector 30 is provided at a tip of the horizontal arm 29. The detector 30 includes a probe 31. The circularity measuring apparatus 10 measures the measurement target by bringing this probe 31 into contact with the measurement target placed on the mounting base 12, and sends a detection signal obtained from the measurement to the computing apparatus via the detector 30 for processing in the computing apparatus. Note that a center-deviation adjusting mechanism 32 is installed at the tip of the horizontal arm 29.

Figure 2:
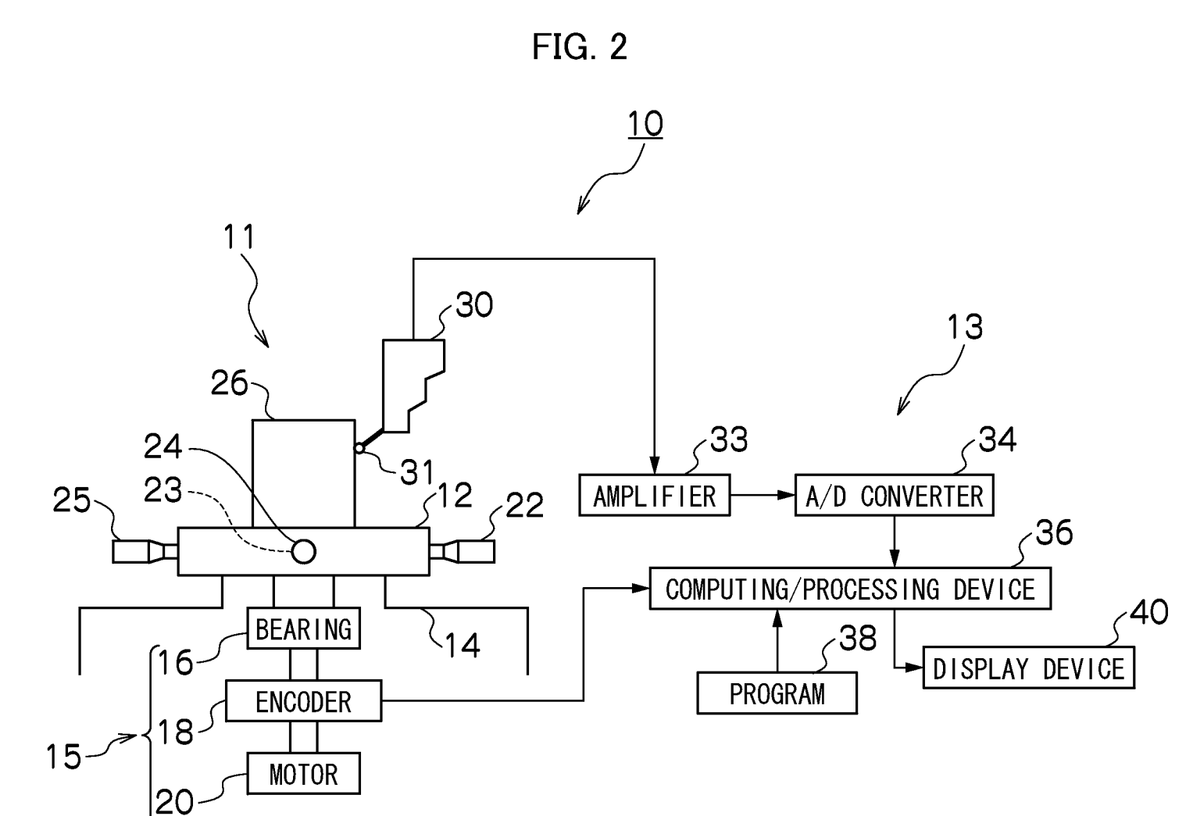
FIG. 2 is a block diagram of the structure of the circularity measuring apparatus depicted in FIG. 1.

FIG. 2 is a block diagram of the structure of the circularity measuring apparatus 10.

As depicted in FIG. 2, the circularity measuring apparatus 10 includes the measuring machine body 11 and a computing apparatus 13. As for the measuring machine body 11, description made below may partially overlap the description of FIG. 1.

The measuring machine body 11 is provided with the mounting base 12 on the base 14, the mounting base 12 being rotatable by the rotary mechanism 15. The mounting base 12 is provided with the X-direction fine-adjustment knob 22 and the Y-direction fine-adjustment knob 24 for fine adjustment in a horizontal direction and the X-direction tilt knob 25 and the Y-direction tilt knob 23 for tilt adjustment in a vertical direction.

The mounting base 12 is rotated by the rotary mechanism 15 including a bearing 16, an encoder 18, a motor 20, and others. The mounting base 12 is rotatably supported by the motor 20 via the bearing 16. The encoder 18 is mounted on a rotating shaft of the motor 20, so as to read (obtain) reading a rotation angle with high accuracy. An example of the bearing 16 for use is a static-pressure air bearing with extremely high accuracy. The mounting base 12 is rotated with an extremely high rotational accuracy (for example, 0.005 μm).

Also, the slider 28 is attached to the column 27 standing on the base 14 in a manner that can be movable upward and downward, and the horizontal arm (diameter-direction moving shaft, X-axis direction in FIG. 1 and so on) 29 is attached to the slider 28 in a manner that can be driven in a horizontal direction. The detector 30 is provided at the tip of the horizontal arm 29, and the probe 31 is installed at the detector 30. Furthermore, as the detector 30, an electric micrometer using a differential transformer is used so as to detect an amount of displacement of the probe 31 in contact with a measurement target 26.

At the time of measurement, the measurement target 26 is placed on the mounting base 12, and the probe 31 is brought into contact with the measurement target for measurement. A detection signal obtained from the measurement is sent to the computing apparatus 13 via the detector 30.

The computing apparatus 13 includes an amplifier 33, an A/D converter 34, a computing/processing device 36, and a program 38 stored in a memory for controlling these components, and further includes display unit for displaying the process results.

The detection signal obtained by bringing the probe 31 into the measurement target 26 is sent to the computing apparatus 13 via the detector 30. In the computing apparatus 13, the detection signal is first amplified by the amplifier 33, is then converted by the A/D converter 34 into a digital signal, and is outputted to the computing/processing device 36.

When the circularity and others of the measurement target 26 are measured by this circularity measuring apparatus 10, after the measurement target 26 is placed on the mounting base 12, correction of eccentricity between a rotation center of the mounting base 12 and a center of the measurement target 26, and correction of the tilt of the measurement target 26 with respect to a rotation axis of the mounting base 12 are first performed. With this, it is hereinafter assumed that the rotation center of the mounting base 12 and the center of the measurement target 26 match each other.

Next, with the probe 31 of the detector 30 in contact with a side surface of the measurement target 26, the mounting base 12 is rotated once by the motor 20, and data for one round of a side surface of the measurement target 26 is collected as an analog voltage value. A detection signal obtained as an analog voltage value is amplified by the amplifier 33 as described above, is converted by the A/D converter 34 to a digital signal, and is then outputted to the computing/processing device 36. The computing/processing device 36 computes a circularity of the measurement target 26 from the rotation angle data inputted from the encoder 18 and the displacement data detected by the detector 30, and causes the computation results to be displayed on the display device 40.

Note that while the above-described circularity measuring apparatus 10 is a mounting-base-rotation-type circularity measuring apparatus in which the mounting base 12 where the measurement target 26 is placed rotates and the probe 31 does not rotate but only moves forward and backward (in a moving direction of the horizontal arm 29) and upward and downward (in a moving direction of the slider 28), it should be noted that the present invention is not restricted to this mounting-base-rotation-type circularity measuring apparatus. The present invention can also be applied to a detector-rotation-type circularity measuring apparatus in which the mounting base does not rotate and the probe moves forward, backward, upward, and downward and rotates about the measurement target for measurement.

Figure 3:
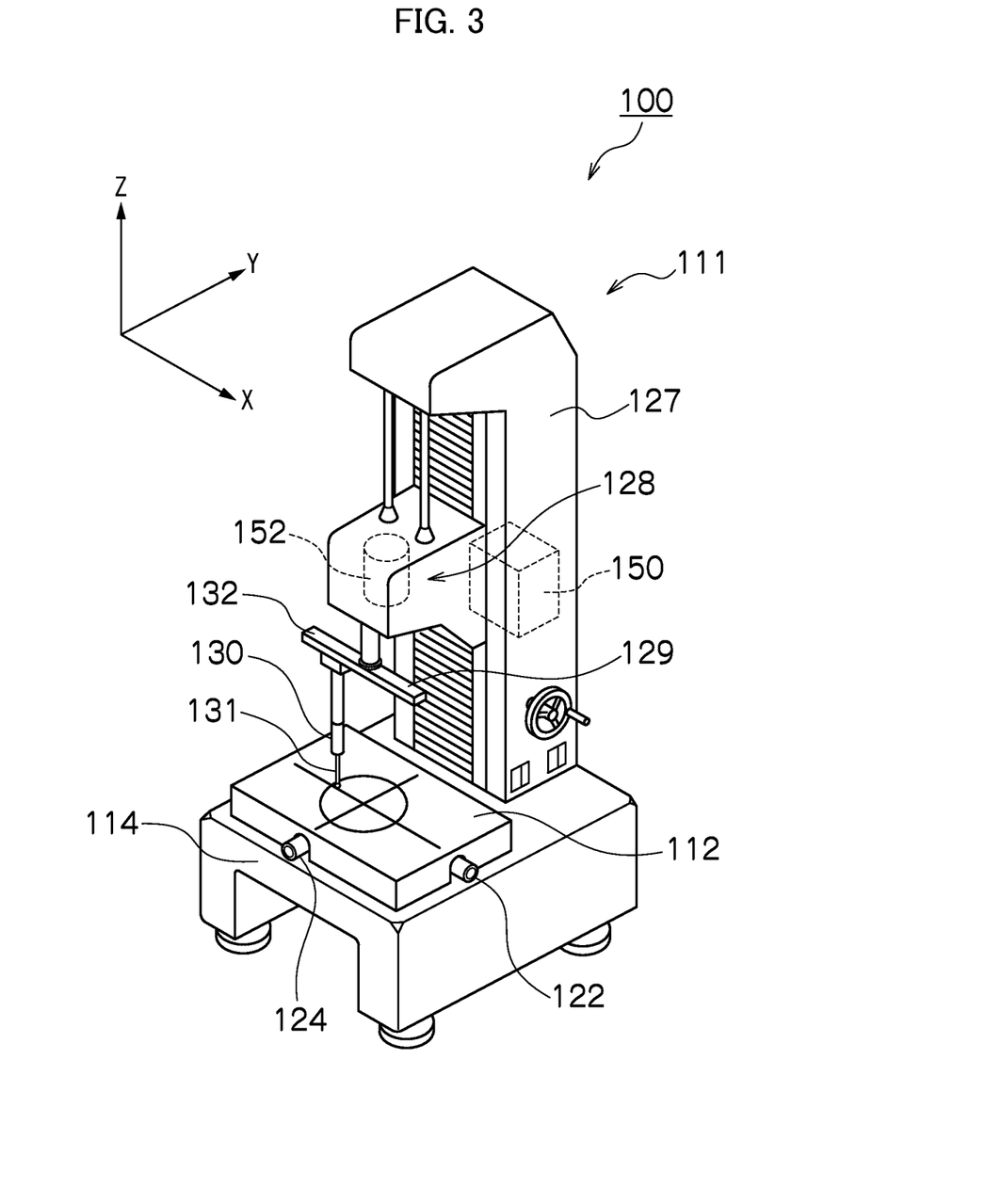
FIG. 3 is an external perspective view of a measuring machine body of a detector-rotation-type circularity measuring apparatus.

FIG. 3 is an external perspective view of a measuring machine body of a detector-rotation-type circularity measuring apparatus.

As depicted in FIG. 3, a measuring machine body 111 of this circularity measuring apparatus 100 is provided with a mounting base 112 where a measurement target is placed on a base 114. The mounting base 112 has an X-direction fine-adjustment knob 122 and a Y-direction fine-adjustment knob 124. Note that, as with the previous example, the measuring machine body 111 may include an X-direction tilt knob and a Y-direction tilt knob, although not shown.

Also, a column 127 extending approximately vertically upward stands on the base 114. A slider 128 is attached to the column 127 in a manner that can be vertically movable. The slider 128 is moved upward and downward by a feeding apparatus 150 provided to the column 127. Furthermore, a horizontal arm (a diameter-direction moving shaft) 129 is attached to a lower side of the slider 128, and a detector 130 and a probe 131 are installed on the horizontal arm 129.

While bringing the probe 131 into contact with the measurement target placed on the mounting base 112, the circularity measuring apparatus 100 measures the measurement target by rotating the probe 131 about the measurement target. A detection signal obtained from the measurement is sent to a computing apparatus not shown via the detector 130, and the detection signal is processed by the computing apparatus. Note that a center-deviation adjusting mechanism 132 is installed between the horizontal arm 129 and the detector 130.

In the following, calculation of a center deviation amount by the circularity measuring apparatus 10 (or 100) of the present embodiment and the center-deviation-amount correcting method using the calculation are described.

Figure 4:
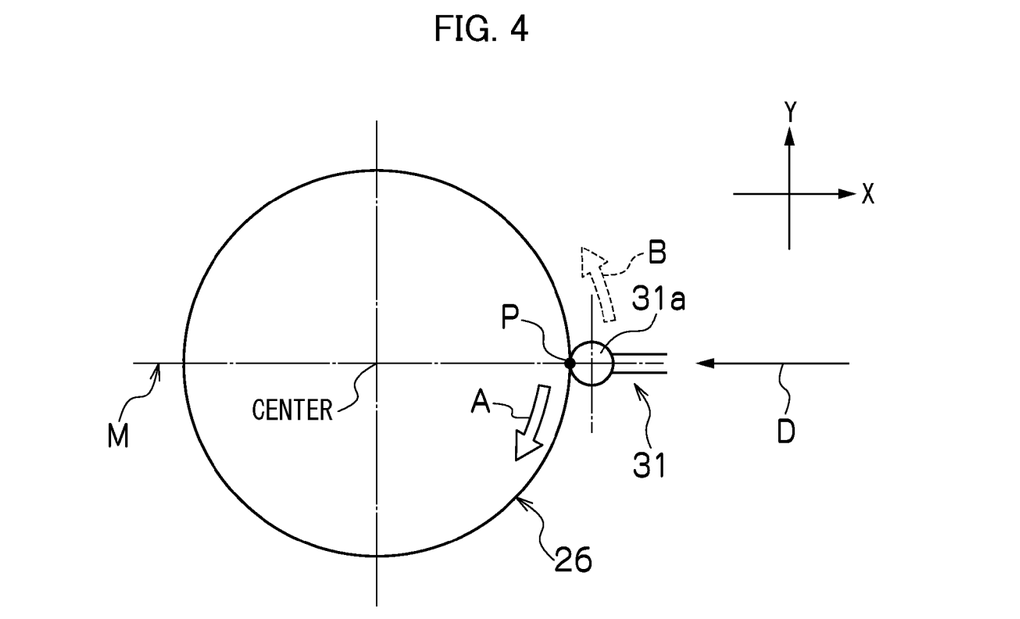
FIG. 4 is a plan view of an ideal case without a center deviation when measurement of a measurement target is performed by the circularity measuring apparatus.

At the time of circularity measurement, as depicted in FIG. 4, a tip ball 31a of the probe 31 is brought into contact with the measurement target 26 placed on the mounting base 12 (not shown herein).

Then, in the case of the mounting-base-rotation-type circularity measuring apparatus 10, as indicated by an arrow A in FIG. 4, the measurement target 26 is rotated by rotating the mounting base 12. By contrast, in the case of the detector-rotation-type circularity measuring apparatus 100, as indicated by an arrow B in FIG. 4, the probe 31 (the tip ball 31a) is rotated along the outer perimeter of the measurement target 26. Note that it is assumed that the center of the measurement target 26 and the rotation center of the mounting base 12 match each other. Also, here, the center of the measurement target 26 is assumed to be a center of a least square circle of a shape forming the outer perimeter of the measurement target 26 (accurately speaking, a shape of the outer perimeter of a cross-section including a point (a detection point) where the tip ball 31a is brought into contact for measurement, the shape parallel to the surface of the mounting base 12).

Here, in any case, the tip ball 31a of the probe 31 is in contact with the measurement target 26. For example, in the case of the mounting-base-rotation-type circularity measuring apparatus 10, as indicated by an arrow D in FIG. 4, the measurement target 26 is rotated in a direction indicated by the arrow A while the tip ball 31a is always pressed onto an outer surface of the measurement target 26. Here, when the measurement target 26 does not have a perfect circular shape and the diameter is changed with the rotation of the measurement target 26, the tip ball 31a comes closer to or goes away from a rotation center side, that is, the position of the tip ball 31 is changed in the direction indicated by the arrow D. By detecting a change in position of this tip ball 31a via the detector 30 and processing the detection result in by the computing apparatus 13, the circularity of the measurement target 26 is detected.

In FIG. 4, the tip ball 31a is linearly movable in parallel to the arrow D. Hereinafter, the straight line which is parallel to the arrow D and passes through the center of the substantially circular (round) measurement target 26 is referred to as the center line M of the measurement target 26.

As depicted in FIG. 4, when a detection point P where the tip ball 31a of the probe 31 performs detection while moving in a detecting direction indicated by the arrow D to be brought into contact with the measurement target 26, matches a center line M passing through the center of the measurement target 26, the circularity of the measurement target 26 can be accurately measured. In other words, in order to accurately measure the circularity (diameter) of the measurement target 26, it is required that when the measurement is performed, the tip ball 31a of the probe 31 is abut on the surface of the measurement target 26 in a manner that the center of the tip ball 31a of the probe 31 is located on an extended straight line of the center line M of the measurement target 26.

In actual measurement, however, the detection point P of the tip ball 31a of the probe 31 with respect to the measurement target 26 does not necessarily match the center line M of the measurement target 26.

Figure 5:
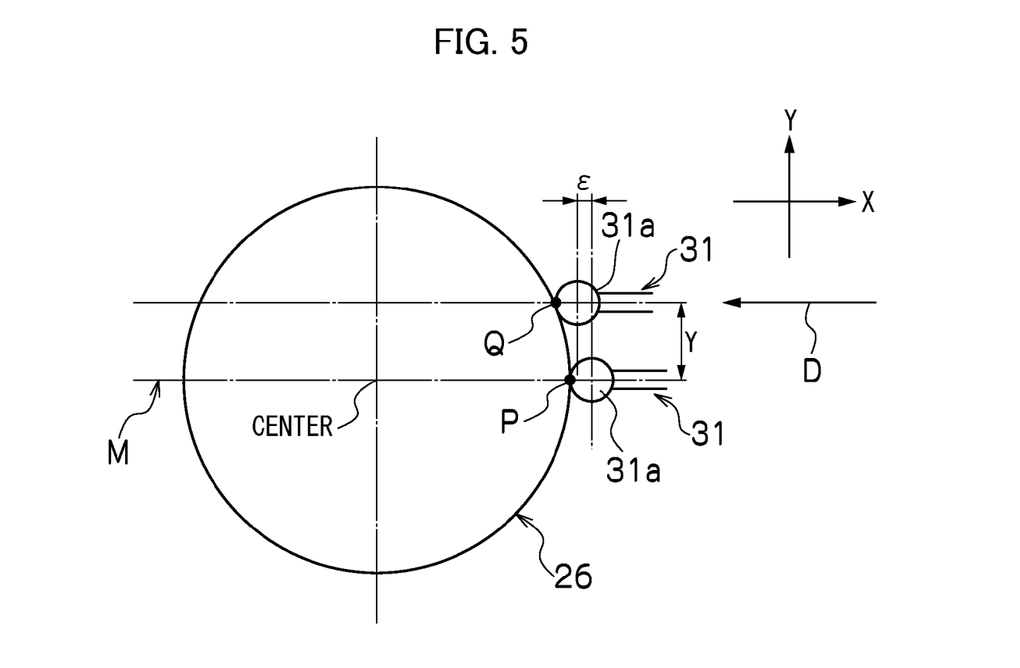
FIG. 5 is a plan view of a case with a center deviation when measurement of a measurement target is performed by the circularity measuring apparatus.

Depending on the apparatus, as depicted in FIG. 5, for example, a detection point Q where the tip ball 31a of the probe 31 is in contact with the measurement target 26 may not match the center line M of the measurement target 26. In this case, a measurement error occurs by a distances between the center of the tip ball 31a at the detection point P matching the center line M of the measurement target 26 and the center of the tip ball 31a at the detection point Q in the actual measurement, regarding the detecting direction D of the tip ball 31a.

Also, a distance Y between the center of the tip ball 31a at the detection point P and the center of the tip ball 31a at the detection point Q regarding a direction perpendicular to the detecting direction D represents a deviation of the detection point Q from the center line M. In other words, the distance Y represents a distance (deviation) between a path (arrow D) along which the center of the tip ball 31a linearly moves and the center of the measurement target 26. This value Y represents a center deviation amount.

Next, a method of finding this center deviation amount Y is described.

In the method described below, two points of a reference measurement target having a known diameter value, the two points opposing in the detecting direction of the probe 31 are measured and, from their measurement error, a center deviation amount is calculated for correction.

Figure 6:
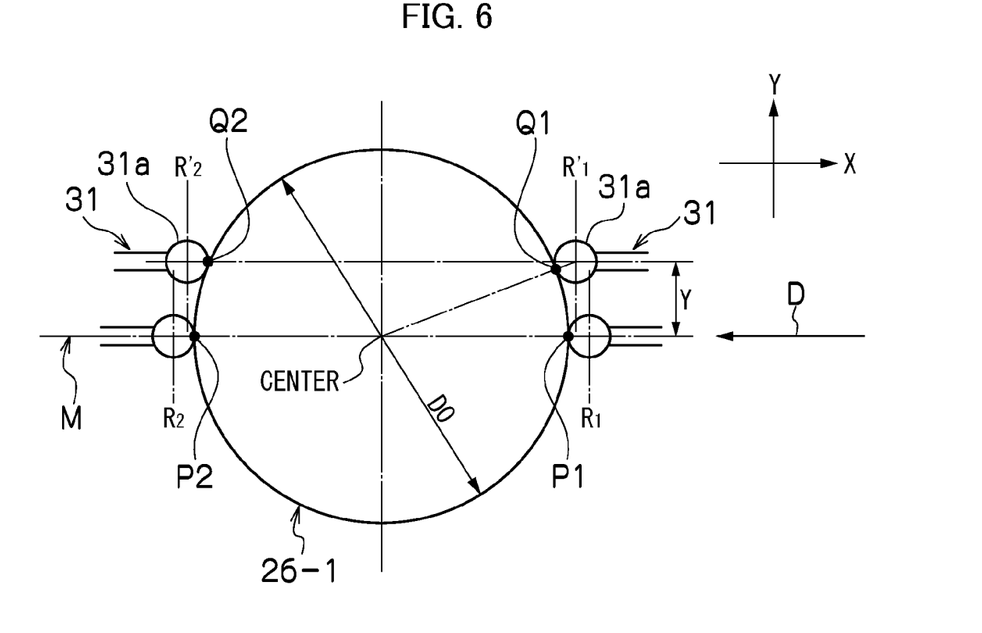
FIG. 6 is a plan view depicting the state in which a center deviation amount is found by measuring a reference measurement target having a known diameter at two, left and right, points facing each other that are positioned away from a center line.

As depicted in FIG. 6, measurement is performed in a state where the tip ball 31a of the probe 31 of the circularity measuring apparatus 10 is brought into contact with a reference measurement target 26-1 having a known diameter value from right and left sides each in a direction parallel to the detecting direction indicated by the arrow D in the drawing.

It is assumed herein that the reference measurement target 26-1 has a diameter value $D_0$ and the tip ball 31a has a diameter d.

Here, a right-side detection point is taken as $P_1$ and a left-side detection point is taken as $P_2$ when it is assumed that the tip ball 31a of the probe 31 is in correct contact with the reference measurement target 26-1 without center deviation. That is, it is assumed that the detection point $P_1$ and the detection point $P_2$ locate on the center line M of the reference measurement target 26-1. Also, a detection value at the right-side detection point $P_1$ is taken as $R_1$ and a detection value at the left-side detection point $P_2$ is taken as $R_2$. Here, from the drawing, a difference $R_1-R_2$ between the detection value $R_1$ and the detection value $R_2$ is a sum of the diameter value $D_0$ of the reference measurement target 26-1 and the diameter d of the tip ball 31a.

That is, $R_1-R_2=D_0+d$.

Next, the case is considered that there is a center deviation in the tip ball 31a of the probe 31, that is, the probe 31 and the reference measurement target 26-1 relatively move in a direction orthogonal to the center line M of the reference measurement target 26-1 in FIG. 6. In this case, measurement in performed in a state where the tip ball 31a of the probe 31 of the circularity measuring apparatus 10 is brought into contact with the reference measurement target 26-1 having a known diameter value from right and left sides each in a direction parallel to the detecting direction indicated by the arrow D in the drawing.

Here, a right-side detection point where the tip ball 31a is brought into contact with the reference measurement target 26-1 from the right side is taken as $Q_1$, and a detection value at this time is taken as $R_1'$. Also, a left-side detection point where the tip ball 31a is brought into contact with the reference measurement target 26-1 from the left side is taken as $Q_2$, and a detection value at this time is taken as $R_2'$.

In this case, when a center deviation amount, which is a distance by which the probe 31 is shifted in a direction orthogonal to the center line M of the reference measurement target 26-1, is taken as Y, a measurement value $(R_1'-R_2')$ obtained by measuring the right side and the left side of the reference measurement target 26-1 is represented by the following Equation (1):

$$R_1'-R_2'=2\sqrt{[\{(D_0/2)+(d/2)\}^2-Y^2]} \quad (1),$$

where $\sqrt{[*]}$ represents the square root of *.

Therefore, if $R_1'-R_2'$ is measured, since $D_0$ and d are known, the center deviation amount Y can be found as in the following Equation (2) by solving the above Equation (1):

$$Y=\sqrt{[\{(D_0/2)+(d/2)\}^2-(R_1'-R_2')^2/4]} \quad (2).$$

Next, a method of correcting the measurement diameter value and others by using the calculated center deviation amount Y is described.

Figure 7:
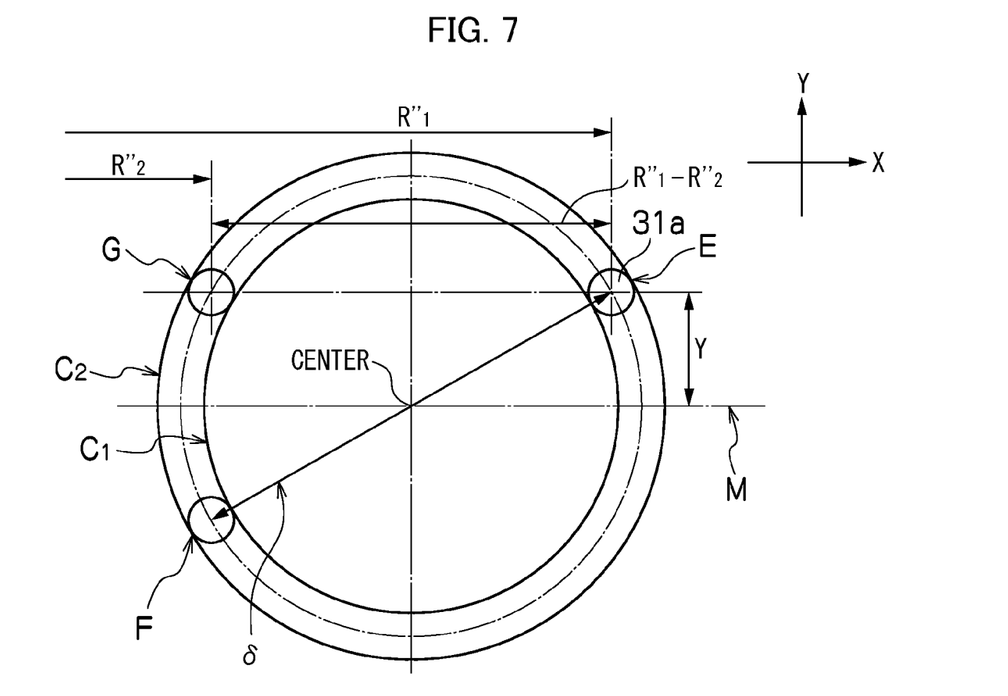
FIG. 7 is a plan view depicting a method of correcting the measured diameter value by using a calculated center deviation amount Y.

In FIG. 7, the case where an outer diameter of the measurement target is measured (i.e., the case where the tip ball 31a is circumscribed with a circle $C_1$ representing an outer shape of a circular measurement target) and the case where an inner diameter of the measurement target is measured (i.e., the case where the tip ball 31a is inscribed with a circle $C_2$ inside a cylindrical measurement target) are described.

That is, it is assumed in FIG. 7 that the tip ball 31a is circumscribed with the circle $C_1$ and inscribed with the circle $C_2$. Also, when the tip ball 31a is located at positions E and F facing each other with respect to the diameter of the circle $C_1$, a distance between the centers of the tip ball 31a at the respective positions is taken as δ. It is further assumed that the circle $C_1$ has a diameter $D_1$ and the tip ball 31a has a diameter d.

Here, for measurement, the tip ball 31a is brought into contact with the circle $C_1$ from a right side at the position E, and the tip ball 31a is also brought into contact with the circle $C_1$ from a left side at a position G facing the position E in a direction parallel to the center line M with respect to the circle $C_1$.

A detection value obtained from measurement by bringing the tip ball 31a into contact with the circle $C_1$ from the right side at the position E is taken as $R_1''$, and a detection value obtained from measurement by bringing the tip ball 31a into contact with the circle $C_1$ from the left side at the position G is taken as $R_2''$.

In this case, the center deviation amount Y, which is a distance of the tip ball 31a at the position E from the center line M can be found as described above.

As can be seen from the drawing, by using this center deviation amount Y, the distance δ between the centers of the tip ball 31a at two positions E and F described above can be represented by the following Equation (3):

$$\delta=\sqrt{[(R_1''-R_2'')^2+(2Y)^2]} \quad (3).$$

Therefore, by correcting the measurement diameter $(R_1''-R_2'')$ with the center deviation amount Y, the diameter $D_1$ of the circle $C_1$ obtained from measurement by circumscribing the tip ball 31a can be found with the following Equation (4):

$$D_1=\sqrt{[(R_1''-R_2'')^2+(2Y)^2]}-d \quad (4).$$

Also, a diameter $D_2$ of the circle $C_2$ obtained from measurement by inscribing the tip ball 31a can be found with the following Equation (5):

$$D_2=\sqrt{[(R_1''-R_2'')^2+(2Y)^2]}+d \quad (5).$$

As such, according to the present embodiment, by measuring the reference measurement target having a known diameter value from two, left and right, positions facing in a direction parallel to the center line M, the center deviation amount Y can be calculated. Also, by correcting the diameter value obtained by measuring an arbitrary measurement target with the use of this calculated center deviation amount Y, a true diameter value of the arbitrary measurement target can be calculated.

As an application of the present embodiment, as depicted in FIG. 8, by measuring two reference measurement targets each having a known diameter value, that is, a circle $C_3$ and a circle $C_4$, the center deviation amount Y can be calculated, and the diameter value of the tip ball 31a can also be calculated.

According to this, even when the tip ball 31a wears to have a diameter value different from an initial value, a true diameter value of the wearing tip ball 31a can be found.

It is assumed in FIG. 8 that the circle $C_3$ has a diameter value $D_3$, the circle $C_4$ has a diameter value $D_4$, and the tip ball 31a has a diameter value d.

Here, as with the example described above, if there is no center deviation, a measurement diameter value $R_3-R_4$ when the circle $C_3$ is measured from two, left and right, directions is represented as in the following Equation (6):

$$R_3-R_4=D_3+d \quad (6).$$

Also, if there is no center deviation, a measurement diameter value $R_5-R_6$ when the circle $C_4$ is measured from two, left and right, directions is represented as in the following Equation (7):

$$R_5-R_6=D_4+d \quad (7).$$

Furthermore, if there is a center deviation (the center deviation Y), a measurement diameter value $R_3'-R_4'$ when the circle $C_3$ is measured from two, left and right, directions is represented as in the following Equation (8):

$$R_3'-R_4'=2\sqrt{[\{(D_3/2)+(d/2)\}^2-Y^2]} \quad (8).$$

Similarly, if there is a center deviation (the center deviation Y), a measurement diameter value $R_5'-R_6'$ when the circle $C_4$ is measured from two, left and right, directions is represented as in the following Equation (9):

$$R_5'-R_6'=2[\{(D_4/2)+(d/2)\}^2-Y^2] \quad (9).$$

Therefore, if the measurement diameter values $R_3'-R_4'$ and $R_5'-R_6'$ are obtained by measuring two circles $C_3$ and $C_4$ having the known diameter values $D_3$ and $D_4$, respectively, from the above two Equation (8) and Equation (9), the center deviation amount Y and the diameter value d of the tip ball 31a can be calculated.

As has been described above, according to the present embodiment, by calculating a center deviation amount, which is an amount of deviation between a center line of the measurement target and a detection point, for correction, an accurate diameter value can be calculated even in the case of a measurement target having a diameter value different from the diameter value of the reference measurement target.

While the circularity measuring apparatus and the center-deviation-amount calculating method therefor of the present invention have been described in detail, the present invention is not meant to be restricted to the above examples, and it goes without saying that the present invention can be variously improved and modified in a range not deviating from the gist of the present invention.

What is claimed is:

1. A circularity measuring apparatus for measuring a circularity of a substantially circular measurement target by mounting the measurement target on a mount base in a manner that a center of the measurement target matches with a center of rotation and rotating the measurement target relative to a detector, the apparatus comprising:
    a driving device which linearly moves the detector relative to a measurement target mounted on the mounting base;
    a center deviation amount calculating device which, when the driving device linearly moves the detector relative to a substantially circular reference measurement target with a known diameter mounted on the mounting base and the detector measures a distance between two detection points which are two points on a path along which the detector moves and on a perimeter of the reference measurement target, calculates a center deviation amount representing a distance between the center of the reference measurement target and a straight line representing the path along which the detector moves based on the diameter of the reference measurement target and the distance between the two detection points; and
    a measurement value correcting device which, when the driving device linearly moves the detector relative to an arbitrary measurement target mounted on the mounting base instead of the reference measurement target and the detector measures as a diameter of the arbitrary measurement target, a distance between two detection points which are two points on the path along which the detector moves and on a perimeter of the arbitrary measurement target, corrects the diameter of the arbitrary measurement target using the center deviation amount.

2. The circularity measuring apparatus according to claim 1, wherein
    the center of the arbitrary measurement target is a center of a least square circle of a shape formed by points on an outer perimeter of the arbitrary measurement target with which the detector is in contact at the time of measurement.

3. The circularity measuring apparatus according to claim 1, wherein the two detection points lie on a chord of the substantially circular reference measurement target, said chord being displaced from a line which includes the center of the substantially circular reference measurement target.

4. The circularity measuring apparatus according to claim 3, wherein the detector touches the perimeter of the substantially circular reference measurement target to detect circularity.

5. A measurement value correcting method for a circularity measuring method for measuring a circularity of a substantially circular measurement target by mounting the measurement target on a mount base in a manner that a center of the measurement target matches with a center of rotation and rotating the measurement target relative to a detector, the measurement value correcting method comprising:
    linearly moving the detector relative to a substantially circular reference measurement target with a known diameter mounted on the mounting base;
    measuring a distance between two detection points which are two points on a path along which the detector moves and on a perimeter of the reference measurement target;
    calculating a center deviation amount representing a distance between the center of the reference measurement target and a straight line representing the path along which the detector moves based on the diameter of the reference measurement target and the distance between the two detection points;
    linearly moving the detector relative to an arbitrary measurement target mounted on the mounting base instead of the reference measurement target;
    measuring as a diameter of the arbitrary measurement target, a distance between two detection points which are two points on the path along which the detector moves and on a perimeter of the arbitrary measurement target; and
    correcting the diameter of the arbitrary measurement target using the center deviation amount.

6. The measurement value correcting method for a circularity measuring method according to claim 5, wherein
    the center of the arbitrary measurement target is a center of a least square circle of a shape formed by points on an outer perimeter of the arbitrary measurement target with which the detector is in contact at the time of measurement.

7. A center deviation amount calculating method for a circularity measuring apparatus configured to measure a circularity of a substantially circular measurement target by mounting the measurement target on a mount base in a manner that a center of the measurement target matches with a center of rotation and rotating the measurement target relative to a detector, the center deviation amount calculating method comprising:
    linearly moving the detector relative to a substantially circular reference measurement target with a known diameter mounted on the mounting base;
    measuring a distance between two detection points which are two points on a path along which the detector moves and on a perimeter of the reference measurement target; and
    calculating a center deviation amount representing a distance between the center of the reference measurement target and a straight line representing the path along which the detector moves based on the diameter of the reference measurement target and the distance between the two detection points.

8. A center deviation amount calculating method for a circularity measuring apparatus configured to measure a circularity of a substantially circular measurement target by mounting the measurement target on a mount base in a manner that a center of the measurement target matches with a center of rotation and rotating the measurement target relative to a detector, the center deviation amount calculating method comprising:

linearly moving a tip ball of the detector along a path relative to a substantially circular first reference measurement target with a first known diameter mounted on the mounting base so as to bring the tip ball of the detector into contact with a perimeter of the first reference measurement target, and measuring a first distance between first two detection points at which the perimeter of the first reference measurement target is brought in contact with the tip ball of the detector;

linearly moving the tip ball of the detector along the path relative to a substantially circular second reference measurement target with a second known diameter mounted on the mounting base instead of the first reference measurement target so as to bring the tip ball of the detector into contact with a perimeter of the second reference measurement target, and measuring a second distance between second two detection points at which the perimeter of the second reference measurement target is brought in contact with the tip ball of the detector; and     calculating a center deviation amount representing a distance between the center of each of the first and second reference measurement targets and a straight line representing the path along which the tip ball of the detector moves based on the first and second known diameters and the first and second distances.

9. The center deviation amount calculating method according to claim 8, wherein the calculating step includes calculating a diameter value of the tip ball of the detector based on the first and second known diameters and the first and second distances.

\* \* \* \* \*